United States Patent
Makurin et al.

(10) Patent No.: US 11,128,178 B2
(45) Date of Patent: Sep. 21, 2021

(54) WIRELESS POWER RECEIVING DEVICE AND WIRELESS POWER RECEIVING METHOD USING SAME

(71) Applicant: Samsung Electronics Co., Ltd., Suwon-si (KR)

(72) Inventors: Mikhail Nikolaevich Makurin, Arkhagelsk (RU); Artem Rudolfovich Vilenskiy, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/636,716

(22) PCT Filed: Sep. 7, 2018

(86) PCT No.: PCT/KR2018/010476
§ 371 (c)(1),
(2) Date: Feb. 5, 2020

(87) PCT Pub. No.: WO2019/050319
PCT Pub. Date: Mar. 14, 2019

(65) Prior Publication Data
US 2021/0152024 A1    May 20, 2021

(30) Foreign Application Priority Data
Sep. 7, 2017  (RU) ............ RU2017131462

(51) Int. Cl.
*H02J 50/27* (2016.01)
*H02J 50/40* (2016.01)
*H02J 50/10* (2016.01)

(52) U.S. Cl.
CPC .............. *H02J 50/27* (2016.02); *H02J 50/10* (2016.02); *H02J 50/402* (2020.01)

(58) Field of Classification Search
CPC .......... H02J 50/27; H02J 50/402; H02J 50/10
See application file for complete search history.

(56) References Cited

U.S. PATENT DOCUMENTS

| 4,943,811 A | 7/1990 | Alden et al. |
| 5,045,862 A | 9/1991 | Alden et al. |

(Continued)

FOREIGN PATENT DOCUMENTS

| EP | 0 376 074 A2 | 7/1990 |
| EP | 2 996 194 A1 | 3/2016 |

(Continued)

OTHER PUBLICATIONS

V. Palazzi, M. Del Prete and M. Fantuzzi, "Scavenging for Energy: A Rectenna Design for Wireless Energy Harvesting in UHF Mobile Telephony Bands," in IEEE Microwave Magazine, vol. 18, No. 1, pp. 91-99, Jan.-Feb. 2017, doi: 10.1109/MMM.2016.2616189. (Year: 2017).*

(Continued)

*Primary Examiner* — Daniel Cavallari
(74) *Attorney, Agent, or Firm* — Jefferson IP Law, LLP

(57) ABSTRACT

A wireless power receiving device includes: a body; rectifiers arranged adjacent to the body; ports, each being located between the body and a corresponding one of the rectifiers; and slots penetrating the body, wherein each of the ports electrically connects the body to a corresponding one of the rectifiers, the body and the ports receive a horizontal polarization component of electromagnetic radiation incident on the body, and the slots receive a vertical polarization component of the electromagnetic radiation.

10 Claims, 18 Drawing Sheets

(56) References Cited

U.S. PATENT DOCUMENTS

| | | | |
|---|---|---|---|
| 6,028,555 | A | 2/2000 | Harano |
| 7,400,253 | B2 | 7/2008 | Cohen |
| 8,362,745 | B2 | 1/2013 | Tinaphong |
| 8,373,613 | B2 | 2/2013 | Lin et al. |
| 8,599,086 | B2 | 12/2013 | Wong et al. |
| 9,246,351 | B2 | 1/2016 | Ozaki et al. |
| 9,472,849 | B2 | 10/2016 | Shin et al. |
| 9,672,975 | B2 | 6/2017 | Keeling et al. |
| 9,893,552 | B2 | 2/2018 | Jeon et al. |
| 10,511,101 | B2 | 12/2019 | Sudo et al. |
| 2008/0198082 | A1 | 8/2008 | Soler Castany et al. |
| 2010/0245176 | A1 | 9/2010 | Wong et al. |
| 2013/0249771 | A1 | 9/2013 | Kotter et al. |
| 2014/0375501 | A1 | 12/2014 | Nikitin |
| 2015/0326143 | A1 | 11/2015 | Petras et al. |
| 2016/0079652 | A1 | 3/2016 | Gu et al. |
| 2016/0094091 | A1 | 3/2016 | Shin et al. |
| 2016/0181873 | A1* | 6/2016 | Mitcheson ............. H01Q 1/248 307/104 |
| 2019/0267830 | A1 | 8/2019 | An et al. |

FOREIGN PATENT DOCUMENTS

| | | |
|---|---|---|
| JP | 3815108 B2 | 10/2000 |
| KR | 10-2011-0115157 A | 10/2011 |
| KR | 10-2015-0054887 A | 5/2015 |
| KR | 10-2015-0071970 A | 6/2015 |
| KR | 10-2016-0021578 A | 2/2016 |
| KR | 10-2017-0048586 A | 5/2017 |
| RU | 124 852 U1 | 2/2013 |

OTHER PUBLICATIONS

International Search Report dated Feb. 27, 2019, issued in International Patent Application No. PCT/KR2018/010476.

Russian Search Report dated Mar. 13, 2018, issued in Russian Patent Application No. 2017131462.

Russian Office Action dated Apr. 4, 2018, issued in Russian Patent Application No. 2017131462.

European Search Report dated Jun. 9, 2020; European Appln. No. 18853609.8-1202 / 3654489 PCT/KR2018010476.

\* cited by examiner

WIRELESS POWER RECEIVING DEVICE AND WIRELESS POWER RECEIVING METHOD USING SAME

TECHNICAL FIELD

The present disclosure relates to a device and method for receiving wireless power.

BACKGROUND ART

A wireless charging system includes a source for transmitting power without wires and a receiver for receiving the power. For example, the wireless charging system may use electromagnetic induction. The electromagnetic induction is a phenomenon in which an electric current flows in a closed loop when a magnetic flux passing through the closed loop changes. In this case, the source and the receiver may respectively include coils for power transmission and reception.

As another example, the receiver of the wireless charging system may include a rectenna. The rectenna is a combination of an antenna and a rectifier. When the source radiates electromagnetic radiation towards the receiver, an antenna of the receiver may receive the electronic radiation. The antenna may generate an alternating current signal upon receiving the electromagnetic radiation. The rectifier may convert the alternating current signal into a direct current signal.

DESCRIPTION OF EMBODIMENTS

Technical Problem

Provided is a wireless power receiving device having improved power reception performance.

Also provided is a wireless power receiving method providing improved power pickup efficiency.

However, the problem to be solved is not limited to the above disclosure.

Solution to Problem

According to an aspect of the present disclosure, a wireless power receiving device includes: a body; rectifiers arranged adjacent to the body; ports, each being located between the body and a corresponding one of the rectifiers; and slots penetrating the body, wherein each of the ports electrically connects the body to a corresponding one of the rectifiers, the body and the ports receive a horizontal polarization component of electromagnetic radiation incident on the body, and the slots receive a vertical polarization component of the electromagnetic radiation.

The ports may include a pair of ports protruding outward from one side of the body.

The ports may include the other pair of ports protruding outward from the other side of the body, and the one side and the other side may face in opposite directions.

The ports may include a pair of ports protruding outward from either side of the body.

The wireless power receiving device may further include a frame separated from the ports with the rectifiers interposed therebetween, wherein the frame includes a conductive material, and the rectifiers are electrically connected to the frame.

The ports may be provided on one side of the body, and the frame may contact the other side of the body.

The ports may protrude from the body in a first direction parallel to an upper surface of the body, and the slots may extend in a second direction that is parallel to the upper surface of the body and crosses the first direction.

The wireless power receiving device may further include a substrate on which the body and the ports may be arranged, and the slots may expose an upper surface of the substrate.

A length of each of the slots along the second direction may be half a wavelength of an EH0 mode generated within the substrate.

A length of the body along the second direction may be half a wavelength of an EH1 mode generated within the substrate.

According to another aspect of the present disclosure, a wireless power receiving device includes: a first antenna structure extending in a first direction; and a second antenna structure extending in a second direction crossing the first direction, wherein each of the first and second antenna structures includes: a body; rectifiers arranged adjacent to the body; ports, each being located between the body and a corresponding one of the rectifiers; and slots penetrating the body.

An angle between the first and second directions may be 80° to 100°.

The ports of the first antenna structure may protrude from the body of the first antenna structure in the first direction, and the slots of the first antenna structure may extend in the second direction. The ports of the second antenna structure may protrude from the body of the second antenna structure in the second direction, and the slots of the second antenna structure may extend in the first direction.

The wireless power receiving device may include: a broadcast antenna structure configured to receive electromagnetic radiation travelling in a third direction perpendicular to the first and second directions; and a rectifier electrically connected to the broadcast antenna structure.

The wireless power receiving device may further include: a lower substrate; and an upper substrate stacked on the lower substrate, wherein the first antenna structure is provided on the lower substrate, and the second antenna structure is provided on the upper substrate.

According to another aspect of the present disclosure, a wireless power receiving method includes: receiving, by an antenna structure, electromagnetic radiation to generate alternating current signals; converting, by rectifiers, the alternating signals into direct current signals; and electrically connecting, by a switching unit, one of the rectifiers to a load unit.

The electrical connecting of the one of the rectifiers to the load unit by the switching unit may include: determining, by the switching unit, a rectifier having a maximum energy from among the rectifiers; and electrically connecting, by the switching unit, the rectifier having the maximum energy to the load unit.

The electrical connecting of the one of the rectifiers to the load unit by the switching unit may include sequentially connecting, by the switching unit, the rectifiers to the load unit.

Times during which the rectifiers are connected to the load unit may vary depending on the amount of energy stored in the rectifiers.

The switching unit may connect a rectifier having a relatively large amount of energy to the load unit for a long time compared to when connecting a rectifier having a relatively small amount of energy.

Advantage Effects of Disclosure

A wireless power receiving device having improved power reception performance may be provided.

A wireless power receiving device having improved power pickup performance may be provided.

However, the effects of the disclosure are not limited to the disclosure.

BEST MODE

Figure 1:
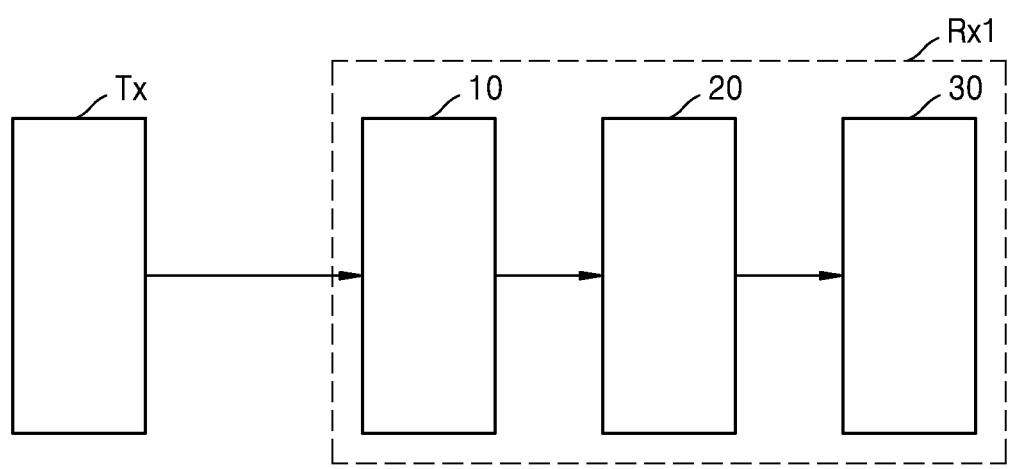
FIG. 1 is a conceptual block diagram of a wireless charging system according to exemplary embodiments.

According to an aspect of the present disclosure, a wireless power receiving device includes: a body; rectifiers arranged adjacent to the body; ports, each being located between the body and a corresponding one of the rectifiers; and slots penetrating the body, wherein each of the ports electrically connects the body to a corresponding one of the rectifiers, the body and the ports receive a horizontal polarization component of electromagnetic radiation incident on the body, and the slots receive a vertical polarization component of the electromagnetic radiation.

According to another aspect of the present disclosure, a wireless power receiving device includes: a first antenna structure extending in a first direction; and a second antenna structure extending in a second direction crossing the first direction, wherein each of the first and second antenna structures includes: a body; rectifiers arranged adjacent to the body; ports, each being located between the body and a corresponding one of the rectifiers; and slots penetrating the body.

MODE OF DISCLOSURE

Hereinafter, embodiments of the present disclosure will be described more fully with reference to the accompanying drawings. In the drawings, like reference numerals denote like elements throughout, and sizes of components in the drawings may be exaggerated for clarity and convenience of explanation. Meanwhile, embodiments to be described below are merely an example, and various changes may be made therein.

It will also be understood that when a layer or element is referred to as being "above" or "on" another layer or substrate, it can be directly on the other layer or substrate, or intervening layers may also be present.

As used herein, singular forms are intended to include the plural forms as well, unless the context clearly indicates otherwise. Furthermore, when a part "includes" or "comprises" an element, unless there is a particular description contrary thereto, the part may further include other elements, not excluding the other elements.

Furthermore, the term "unit" described in the specification refers to a unit for processing at least one function or operation, and may be implemented using hardware or software or a combination of hardware and software.

FIG. 1 is a conceptual block diagram of a wireless charging system according to exemplary embodiments.

Referring to FIG. 1, a wireless power transmitting device Tx and a wireless power receiving device Rx1 may be provided. The wireless power transmitting device Tx may emit a radio frequency (RF) wave. A power may be transferred to the wireless power receiving device Rx1 via the RF wave.

The wireless power receiving device Rx1 may receive the RF wave. The wireless power receiving device Rx1 may include a receiver 10, a rectifying unit 20, and a load unit 30. The receiver 10 may receive the RF wave. For example, the receiver 10 may include an antenna. The receiver 10 may generate an alternating current signal by using the RF wave. For example, the alternating current signal may be an alternating current voltage signal or an alternating current signal. The receiver 10 may provide the alternating current signal to the rectifying unit 20.

The rectifying unit 20 may convert the alternating current signal received from the receiver 10 into a direct current signal. For example, the rectifying unit 20 may include a rectifier. For example, the direct current signal may be a direct current voltage signal or a direct current signal. The rectifying unit 20 may provide the direct current signal to the load unit 30.

The direct current signal may be applied to the load unit 30. The load unit 30 may be an electrical device including a load. For example, the load unit 30 may include an integrated circuit and/or a battery.

Figure 2:
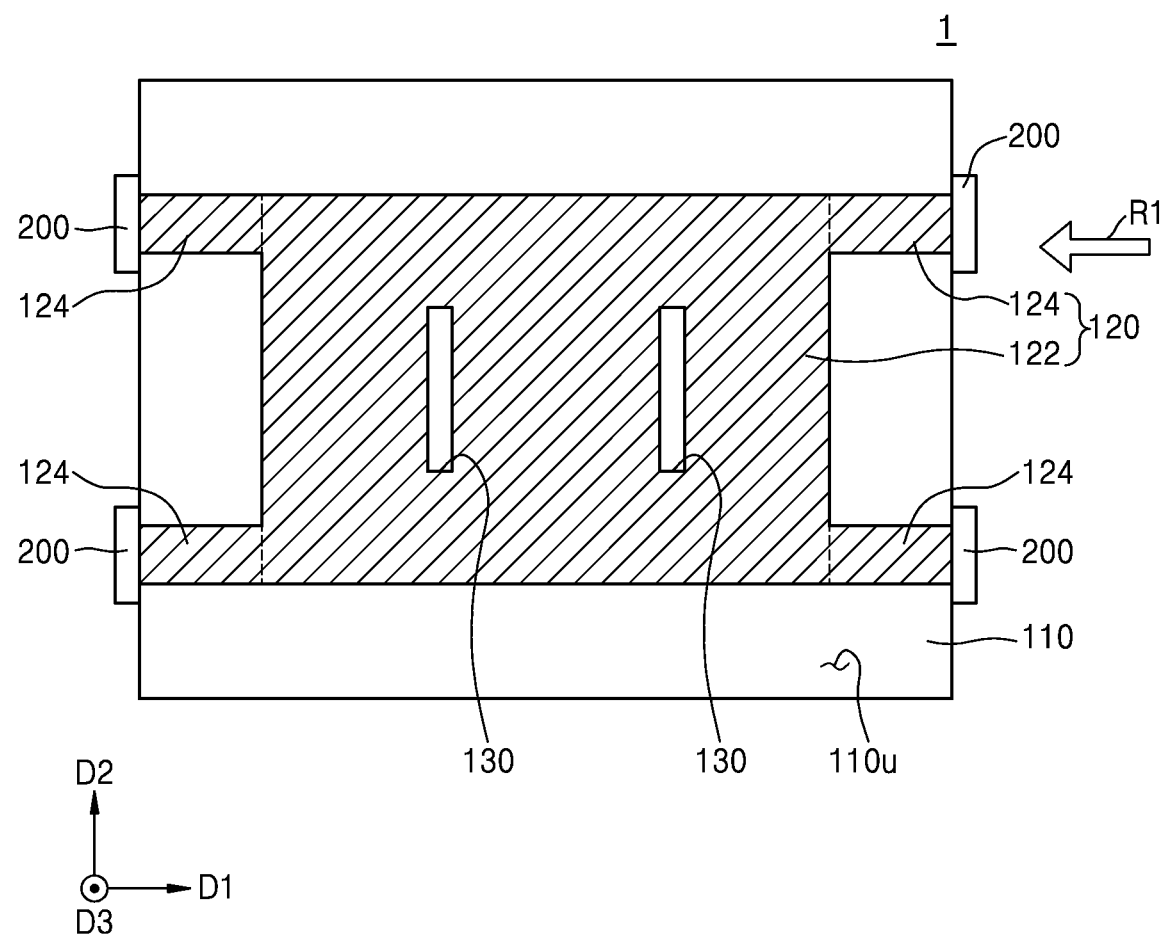
FIG. 2 is a plan view of a wireless power receiving device according to exemplary embodiments.
Figure 3:
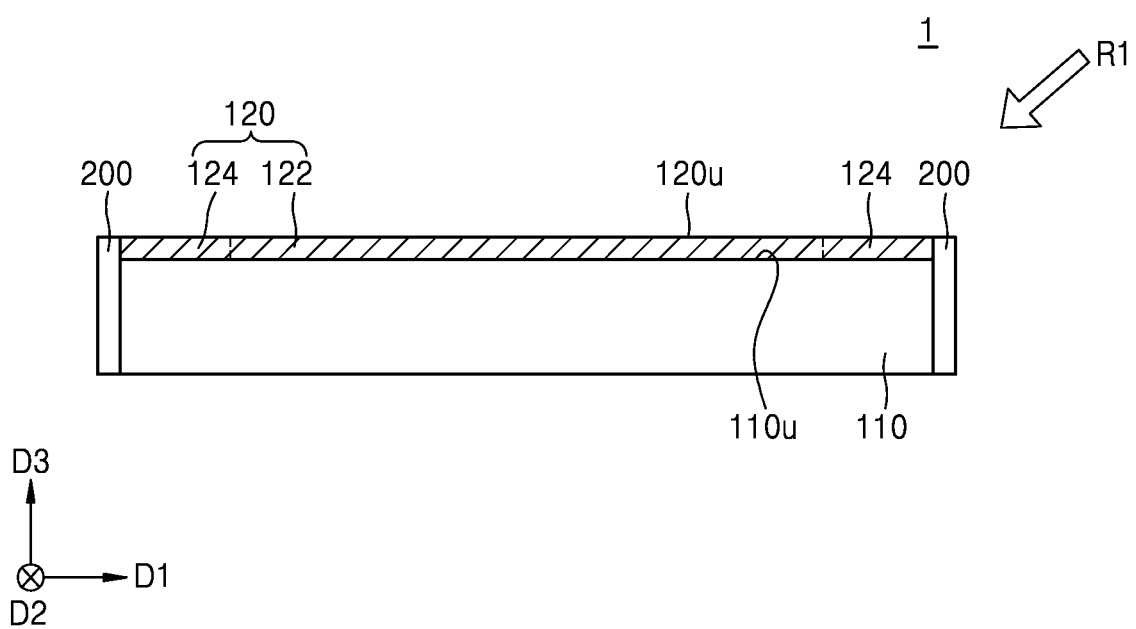
FIG. 3 is a side view of the wireless power receiving device of FIG. 2.

FIG. 2 is a plan view of a wireless power receiving device 1 according to exemplary embodiments. FIG. 3 is a side view of the wireless power receiving device 1 of FIG. 2.

Referring to FIGS. 2 and 3, the wireless power receiving device 1 including a substrate 110, an antenna structure 120, and rectifiers 200 may be provided. The substrate 110 may include a dielectric material. For example, the substrate 110 may include a printed circuit board (PCB). In exemplary embodiments, the substrate 110 may include a ground plate (not shown) and a load (not shown). For example, the ground plate may be provided on a bottom surface of the substrate 110 or within the substrate 110. The ground plate may be located parallel to the antenna structure 120. The ground plate may have a function of grounding the antenna structure 120.

The antenna structure 120 may be provided on the substrate 110. The antenna structure 120 may extend in a first direction D1 parallel to an upper surface 110u of the substrate 110. The antenna structure 120 may include a body 122 and ports 124. For example, the antenna structure 120 including the body 122 having a rectangular shape and the four ports 124 are shown.

The antenna structure 120 may include slots 130. The slots 130 may be provided in the body 122 of the antenna structure 120. For example, a pair of the slots 130 may be provided. The slots 130 may penetrate the body 122 to expose the substrate 110. The slots 130 may be arranged parallel to each other. The slots 130 may extend in a second direction D2 parallel to the upper surface 110u of the substrate 110. The second direction D2 may cross the first direction D1. The slots 130 may be separated from each other in the first direction D1. A length of each of the slots 130 may be approximately half a wavelength of an $EH_0$ mode generated within the substrate 110. The $EH_0$ mode may occur when the antenna structure 120 receives a vertically polarized wave. A distance between the slots 130 may be determined by using the following equation:

$$\sin(\theta) = (c_0/c_1) - (\lambda/d)$$

($\theta$: an angle between a normal line to an upper surface 120u of the antenna structure 120 and electromagnetic radiation R1, $c_0$: speed of light in a vacuum, $c_1$: speed of electromagnetic radiation R1 propagating within the substrate 110 in $EH_0$ mode, $\lambda$: wavelength of electromagnetic radiation R1 in a vacuum, and d: distance between the slots 130)

The four ports 124 may protrude outward from the body 122. One pair of ports 124 among the four ports 124 may protrude from one side of the body 122 in the first direction D1. The pair of ports 124 may be spaced apart from each other in the second direction D2. For example, the pair of ports 124 may be respectively at both ends of the one side of the body 122.

The other pair of ports 124 may protrude outward from the other side of the body 122 in a direction opposite to the first direction D1. The other side and the one side of the body 122 may be located on opposite sides of the body 122. The other pair of ports 124 may be spaced apart from each other in the second direction D2. For example, the other pair of ports 124 may be respectively at both ends of the other side of the body 122.

A length of the antenna structure 120 along the second direction D2 may be greater than a minimum size corresponding to a cut-off frequency of $EH_1$ mode generated in the substrate 110. For example, the length of the antenna structure 120 along the second direction D2 may be equal to half a wavelength of $EH_1$ mode. For example, when a frequency of the electromagnetic radiation R1 is 5.8 gigahertz (GHz) and a dielectric constant of the substrate 110 is 2, the length of the antenna structure 120 along the second direction D2 may be about 18 millimeters (mm) A length of the antenna structure 120 along the first direction D1 may be equal to at least one wavelength of the electromagnetic radiation R1 in a vacuum. For example, when the frequency of electromagnetic radiation R1 is 5.8 GHz, the length of the antenna structure 120 along the first direction D1 may be about 50 mm. The antenna structure 120 may include a conductive material. For example, the antenna structure 120 may include copper (Cu).

The antenna structure 120 may receive electromagnetic radiation R1. The antenna structure 120 may receive electromagnetic radiation R1 from the electromagnetic radiation R1 being incident in the broadside direction to being incident in the end-fire direction. For example, the antenna structure 120 may receive electromagnetic radiation R1 from the electromagnetic radiation R1 being incident perpendicularly to the upper surface 110u of the substrate 110 to being incident parallel to the upper surface 110u thereof.

The present disclosure may provide the wireless power receiving device 1 capable of receiving radio waves incident in the broadside direction and the end-fire direction.

The electromagnetic radiation R1 may include a horizontal polarization component and/or a vertical polarization component. The horizontal polarization component of the electromagnetic radiation R1 may be received by the body 122 to generate a first alternating current signal in the antenna structure 120. The vertical polarization component of the electromagnetic radiation R1 may be received by the slots 130 to generate a second alternating current signal in the antenna structure 120. The first and second alternating current signals may be provided to the rectifiers 200 via the ports 124.

The present disclosure may provide the wireless power receiving device 1 capable of receiving vertically- and horizontally-polarized radio waves.

The rectifiers 200 may be electrically connected to the ports 124, respectively. The rectifiers 200 may be arranged opposite to the body 122 with the ports 124 interposed therebetween. In other words, the body 122 may be electrically connected to one end of each of the ports 124 while each of the rectifiers 200 may be electrically connected to the other end thereof. The rectifiers 200 may convert the first and second alternating current signals into direct current signals. For example, the direct current signal may be a direct current signal or direct current voltage signal. Each of the rectifiers 200 may include a circuit for converting an alternating current signal into a direct current signal.

In other exemplary embodiments, the antenna structure 120 may be positioned on a display of a mobile communication device. For example, the antenna structure 120 may include a transparent metal grid having slots formed therein. Thus, the antenna structure 120 may be transparent. Transparent antenna structures provided on the display of the mobile communication device may receive power wirelessly.

In other exemplary embodiments, the rectifiers 200 may be provided in a separate cover, outer shell, case that is detachable from the mobile communication device.

Figure 4A:
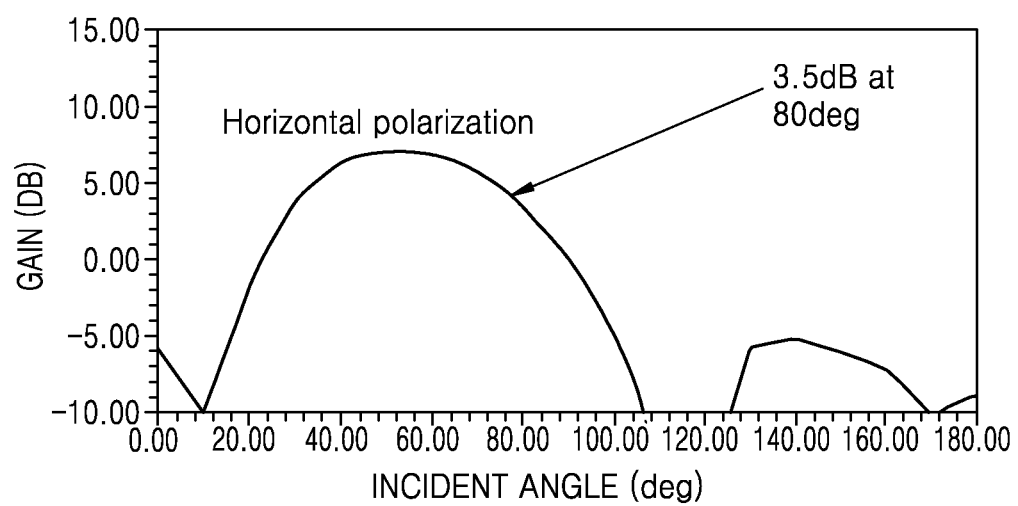
FIGS. 4A and 4B are graphs illustrating experimental results for a gain of the wireless power receiving device of FIGS. 2 and 3.
Figure 4B:
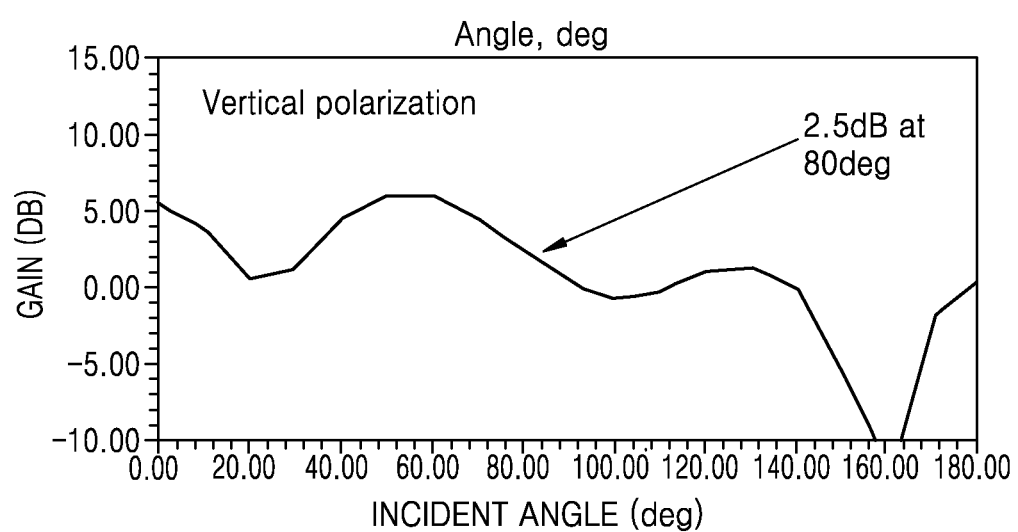

FIGS. 4A and 4B are graphs illustrating experimental results for a gain of the wireless power receiving device 1 of FIGS. 2 and 3. For brevity of description, substantially the same descriptions as already presented with respect to FIGS. 2 and 3 may be omitted.

Referring to FIG. 4A, the wireless power receiving device 1 received horizontally polarized electromagnetic radiation. The gain of the wireless power receiving device 1 with respect to an incident angle of electromagnetic radiation was measured. The incident angle was an angle between a normal line to an upper surface of an antenna structure and electromagnetic radiation. The incident angle varied between 0° and 180°. For example, when the incident angle is 80°, the gain of the wireless power receiving device 1 was 3.5 decibels (dB).

Referring to FIG. 4B, the wireless power receiving device 1 received vertically polarized electromagnetic radiation R1. For example, when an incident angle is 80°, the gain of the wireless power receiving device 1 was 2.5 dB.

The present disclosure may provide the wireless power receiving device 1 capable of receiving radio waves that are incident in the broadside direction and the end-fire direction and have horizontal and vertical polarization components.

Figure 5:
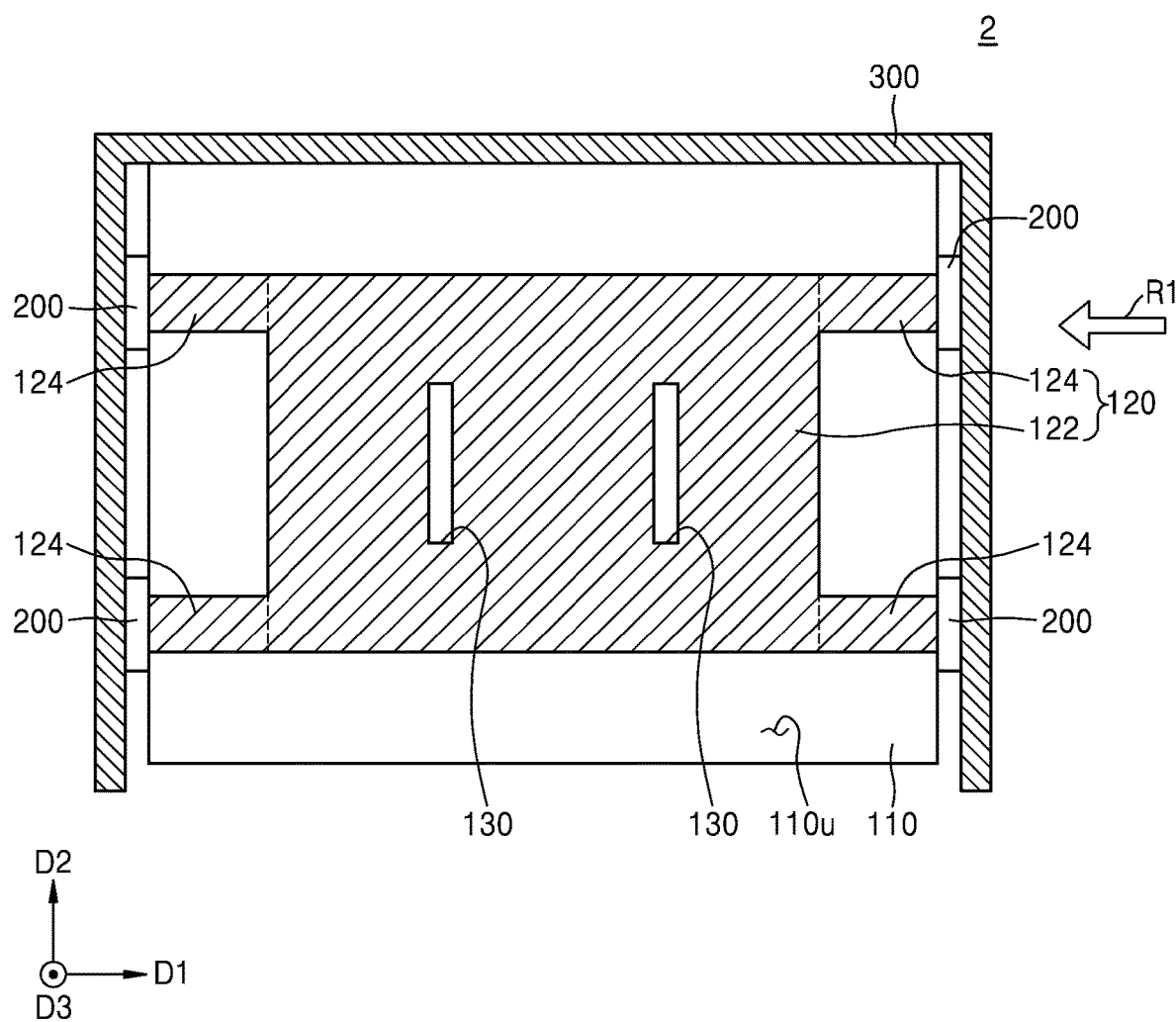
FIG. 5 is a plan view of a wireless power receiving device according to exemplary embodiments.
Figure 6:
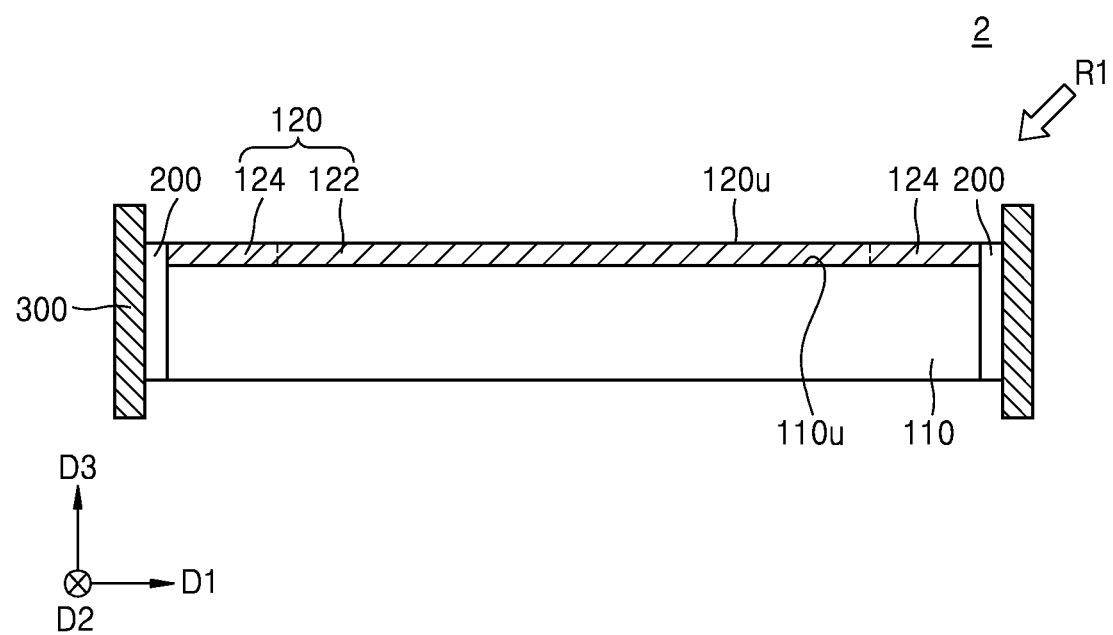
FIG. 6 is a side view of the wireless power receiving device of FIG. 5.

FIG. 5 is a plan view of a wireless power receiving device 2 according to exemplary embodiments. FIG. 6 is a side view of the wireless power receiving device 2 of FIG. 5. For brevity of description, substantially the same descriptions as already presented with respect to FIGS. 2 and 3 may be omitted.

Referring to FIGS. 5 and 6, the wireless power receiving device 2 including a substrate 110, an antenna structure 120, rectifiers 200, and a frame 300 may be provided. The substrate 110, the antenna structure 120, and the rectifiers 200 may be substantially the same as their counterparts described with reference to FIGS. 2 and 3.

The frame 300 may include a conductive material. For example, the frame 300 may include a metal. The frame 300 may be spaced apart from the antenna structure 120 with the rectifiers 200 interposed therebetween. In other words, each of the rectifiers 200 may be located between the frame 300 and the corresponding port 124 of the antenna structure 120. The frame 300 may be electrically connected to the rectifiers 200. The frame 300 may perform a function of grounding the rectifiers 200 In exemplary embodiments, the frame 300 may be an outer shell for a mobile phone (not shown), provided at edges of the mobile phone.

The present disclosure may provide the wireless power receiving device 2 capable of receiving radio waves that are incident in the broadside direction and the end-fire direction and have horizontal and vertical polarization components.

Figure 7:
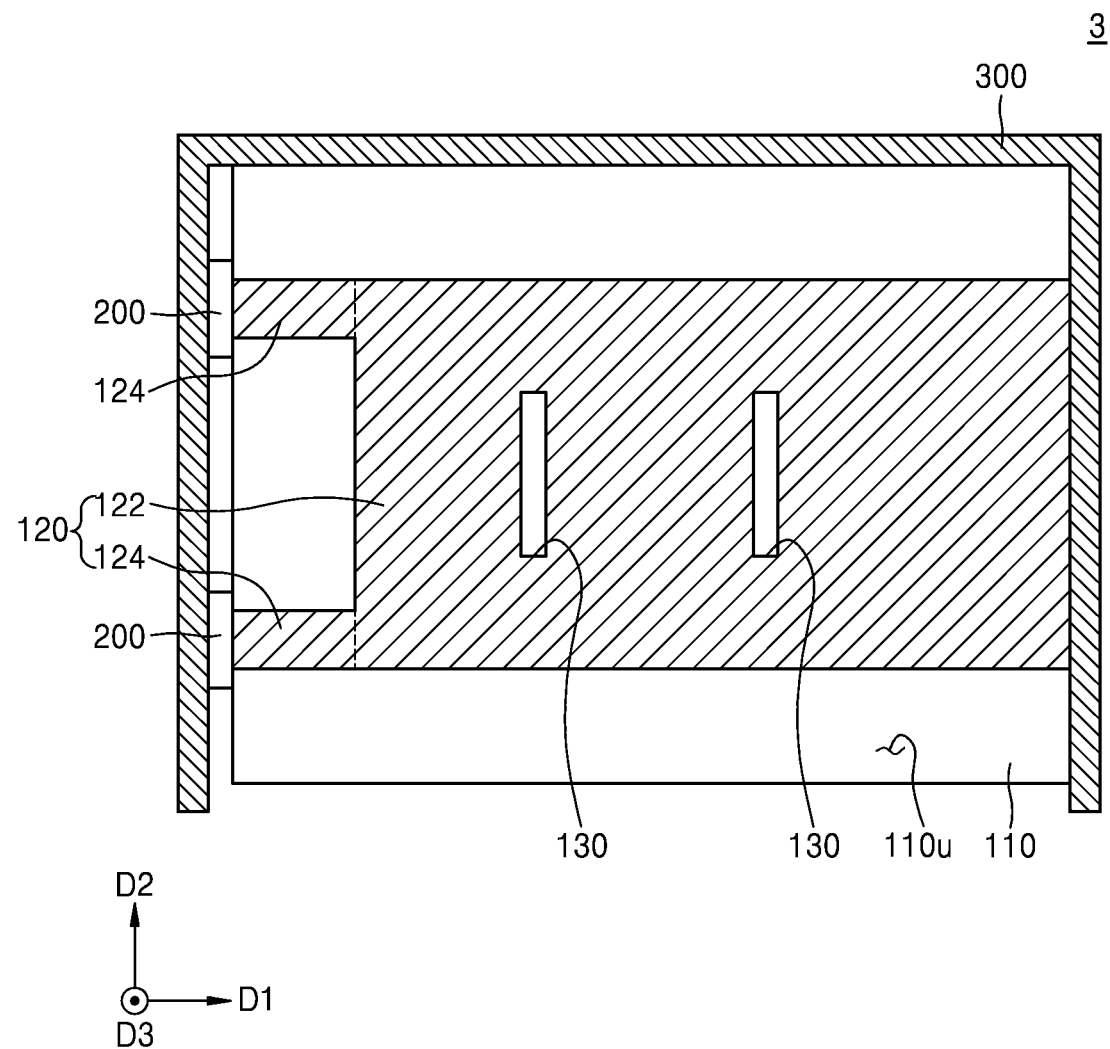
FIG. 7 is a plan view of a wireless power receiving device according to exemplary embodiments.

FIG. 7 is a plan view of a wireless power receiving device 3 according to exemplary embodiments. For brevity of description, substantially the same descriptions as already presented with respect to FIGS. 5 and 6 may be omitted.

Referring to FIG. 7, the wireless power receiving device 3 including a substrate 110, an antenna structure 120, rectifiers 200, and a frame 300 may be provided. Unlike in the descriptions with reference to FIGS. 5 and 6, the antenna structure 120 may include two ports 124. The ports 124 may protrude outward from one side of a body 122. In other words, the ports 124 may not be provided on the other side of the body 122. The ports 124 may be spaced apart from each other in the second direction D2. The other side of the body 122 may directly contact the frame 300.

Each of the rectifiers 200 may be provided between the frame 300 and the corresponding port 124. Unlike in the descriptions with reference to FIGS. 5 and 6, the two rectifiers 200 may be provided. First and second alternating current signals generated in the antenna structure 120 may be provided directly to the rectifiers 200, or may be reflected by the frame 300 and provided to the rectifiers 200.

The present disclosure may provide the wireless power receiving device 3 capable of receiving radio waves that are incident in the broadside direction and the end-fire direction and have horizontal and vertical polarization components.

Figure 8:
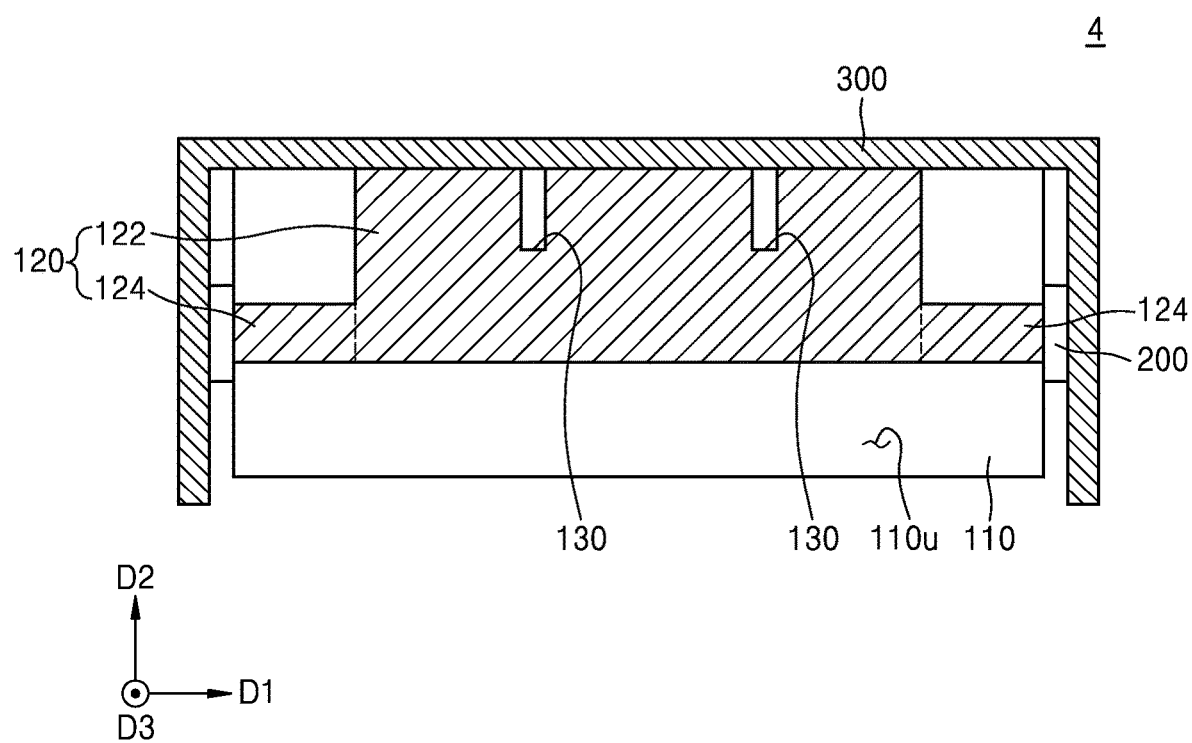
FIG. 8 is a plan view of a wireless power receiving device according to exemplary embodiments.

FIG. 8 is a plan view of a wireless power receiving device 4 according to exemplary embodiments. For brevity of description, substantially the same descriptions as already presented with respect to FIGS. 5 and 6 may be omitted.

Referring to FIG. 8, the wireless power receiving device 4 including a substrate 110, an antenna structure 120, rectifiers 200, and a frame 300 may be provided.

Unlike in the descriptions with reference to FIGS. 5 and 6, the antenna structure 120 may include two ports 124. The ports 124 may protrude outward from one and the other sides of a body 122, respectively. The ports 124 may be separated from each other in the first direction D1.

Another side of the body 122 arranged between the one side and the other side of the body 122 may contact the frame 300 in the second direction D2. The another side of the body 122 may extend along the first direction D1. The another side of the body 122 may be separated from the ports 124 in the second direction D2.

The slots 130 may be defined by the antenna structure 120 and the frame 300. The slots 130 may each expose inner surfaces of the antenna structure 120 and the frame 300. Each of the slots 130 may be formed such that the inner surface of the antenna structure 120 along the first direction D1 may face the inner surface of the frame 300 along the first direction D1.

Each of the rectifiers 200 may be provided between the frame 300 and the corresponding port 124. Unlike in the descriptions with reference to FIGS. 5 and 6, the two rectifiers 200 may be provided.

The present disclosure may provide the wireless power receiving device 4 capable of receiving radio waves that are incident in the broadside direction and the end-fire direction and have horizontal and vertical polarization components.

Figure 9:
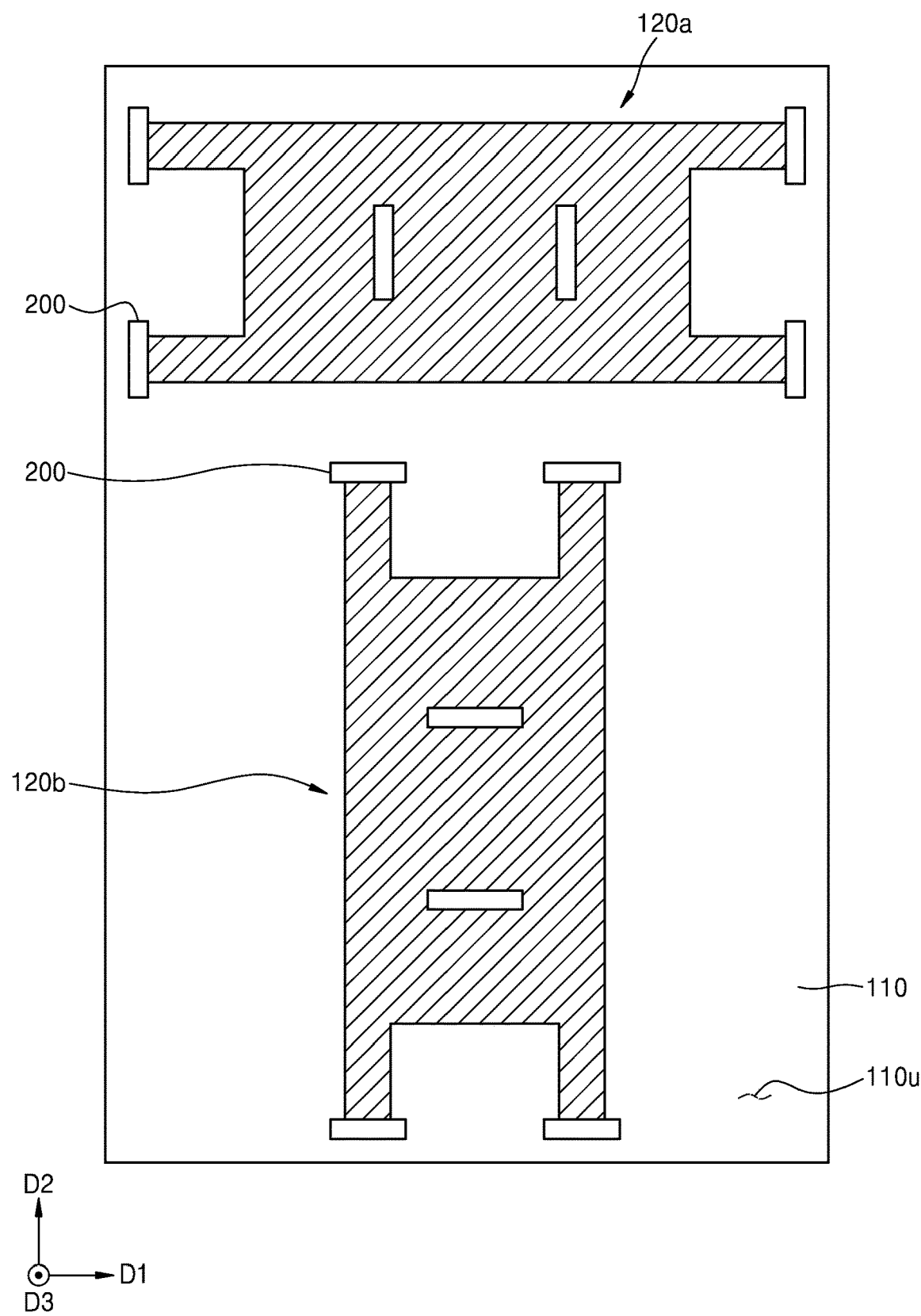
FIG. 9 is a plan view of a wireless power receiving device according to exemplary embodiments.

FIG. 9 is a plan view of a wireless power receiving device 5 according to exemplary embodiments. For brevity of description, substantially the same descriptions as already presented with respect to FIGS. 2 and 3 may be omitted.

Referring to FIG. 9, the wireless power receiving device 5 including a substrate 110, a first antenna structure 120a, a second antenna structure 120b, and rectifiers 200 may be provided. The substrate 110 may be substantially the same as the substrate 110 described with reference to FIGS. 2 and 3.

Each of the first and second antenna structures 120a and 120b may be substantially the same as the antenna structure 120 described with reference to FIGS. 2 and 3, except for its arrangement direction. The first antenna structure 120a may extend in the first direction D1 parallel to an upper surface 110u of the substrate 110. The first antenna structure 120a may have a high efficiency for reception of electromagnetic radiation incident in the first direction D1 and a direction opposite to the first direction D1.

The second antenna structure 120b may extend in the second direction D2 that intersects the first direction D1 and is parallel to an upper surface 110u of the substrate 110. The second antenna structure 120b may have a high efficiency for reception of electromagnetic radiation incident in the second direction D2 and a direction opposite to the second direction D2.

An angle between the direction in which the first antenna structure 120a extends and the direction in which the second antenna structure 120b extends may be about 80° to about 100°. For example, the direction in which the first antenna structure 120a extends may be orthogonal to the direction in which the second antenna structure 120b extends.

The electromagnetic radiations incident along the first and second directions D1 and D2 may be respectively received in the wireless power receiving device 5 by the first and second antenna structures 120a and 120b. A part of the electromagnetic radiation incident along a direction between the first and second directions D1 and D2 may be received in the wireless power receiving device 5 by the first antenna structure 120a while the remaining part may be received therein by the second antenna structure 120b. The present disclosure may provide the wireless power receiving device 5 having a uniform reception efficiency with respect to an incident direction parallel to the upper surface 110u of the substrate 110.

The rectifiers 200 may be respectively electrically connected to corresponding ports of the first and second antenna structures 120a and 120b. In exemplary embodiments, the rectifiers 200 may be electrically connected to a ground plate (not shown) and a load (not shown) through vias (not shown) penetrating the substrate 110.

The present disclosure may provide the wireless power receiving device 5 capable of receiving radio waves that are incident in the broadside direction and the end-fire direction and have horizontal and vertical polarization components.

Figure 10:
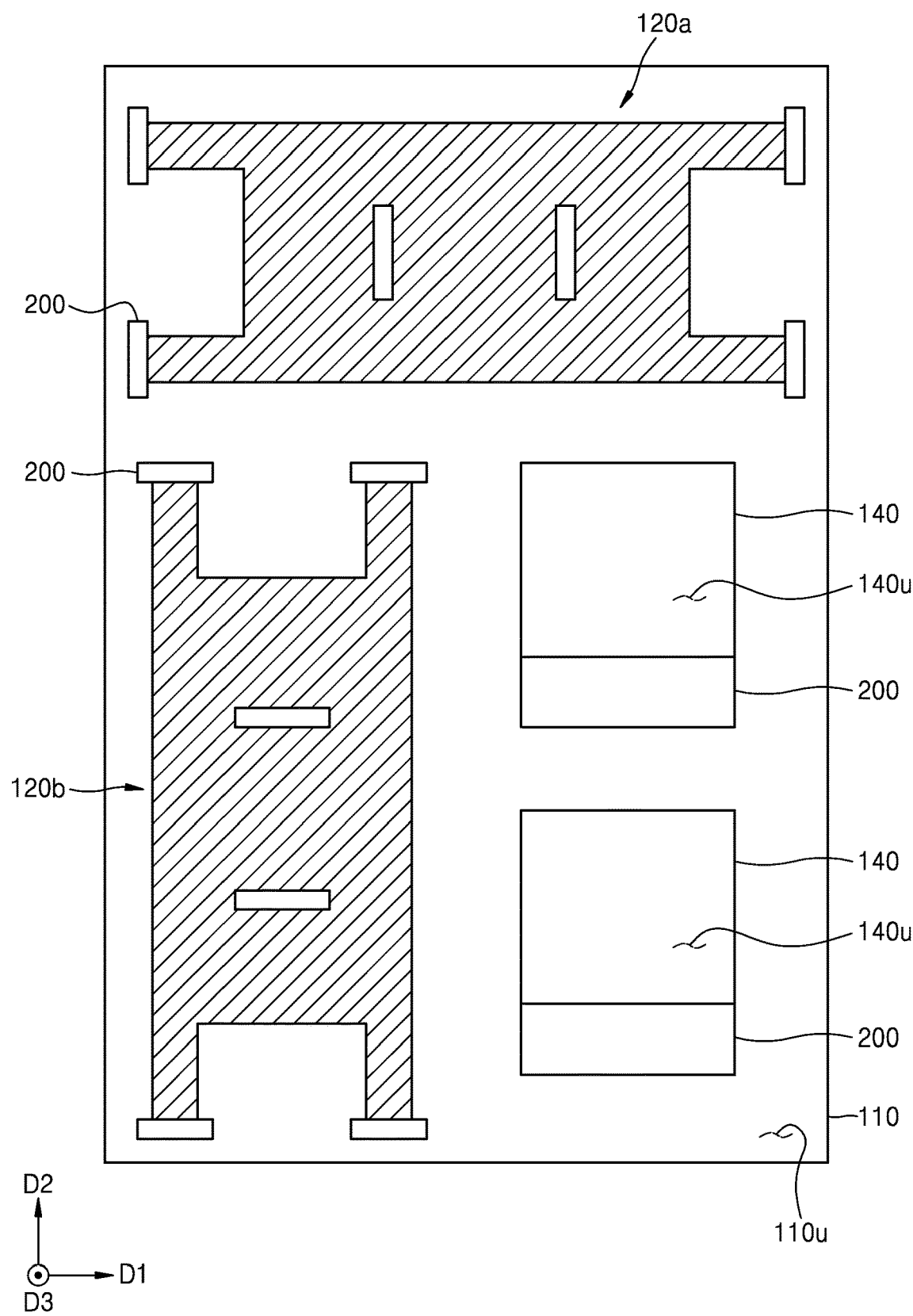
FIG. 10 is a plan view of a wireless power receiving device according to exemplary embodiments.

FIG. 10 is a plan view of a wireless power receiving device 6 according to exemplary embodiments. For brevity of description, substantially the same description as already presented with respect to FIG. 9 may be omitted.

Referring to FIG. 10, the wireless power receiving device 6 including a substrate 110, first and second antenna structures 120a and 120b, broadcast antenna structures 140, and rectifiers 200 may be provided.

Unlike the wireless power receiving device 5 described with reference to FIG. 9, the wireless power receiving device 6 may further include the broadcast antenna structures 140 and rectifiers 200 respectively electrically connected to the broadcast antenna structures 140. According to exemplary embodiments, the broadcast antenna structures 140 may each receive electromagnetic radiation incident in a broadcast direction. For example, each of the broadcast antenna structures 140 may receive electromagnetic radiation that makes an angle of about 50° to about 90° with an upper surface 140 u thereof. Accordingly, power reception efficiency of the wireless power receiving device 6 may be improved.

The rectifiers 200 may be respectively electrically connected to the broadcast antenna structures 140. The rectifiers 200 may respectively receive alternating current signals generated by the corresponding broadcast antenna structures 140. The rectifiers 200 may respectively convert the alternating current signals into direct current signals and transmit the direct current signals to a load unit (not shown).

The present disclosure may provide the wireless power receiving device 6 with power reception efficiency improved by the first and second antenna structures 120a and 120b and the broadcast antenna structures 140. The present disclosure may provide the wireless power receiving device 6 capable of receiving radio waves that are incident in the broadside direction and the end-fire direction and have horizontal and vertical polarization components.

Figure 11:
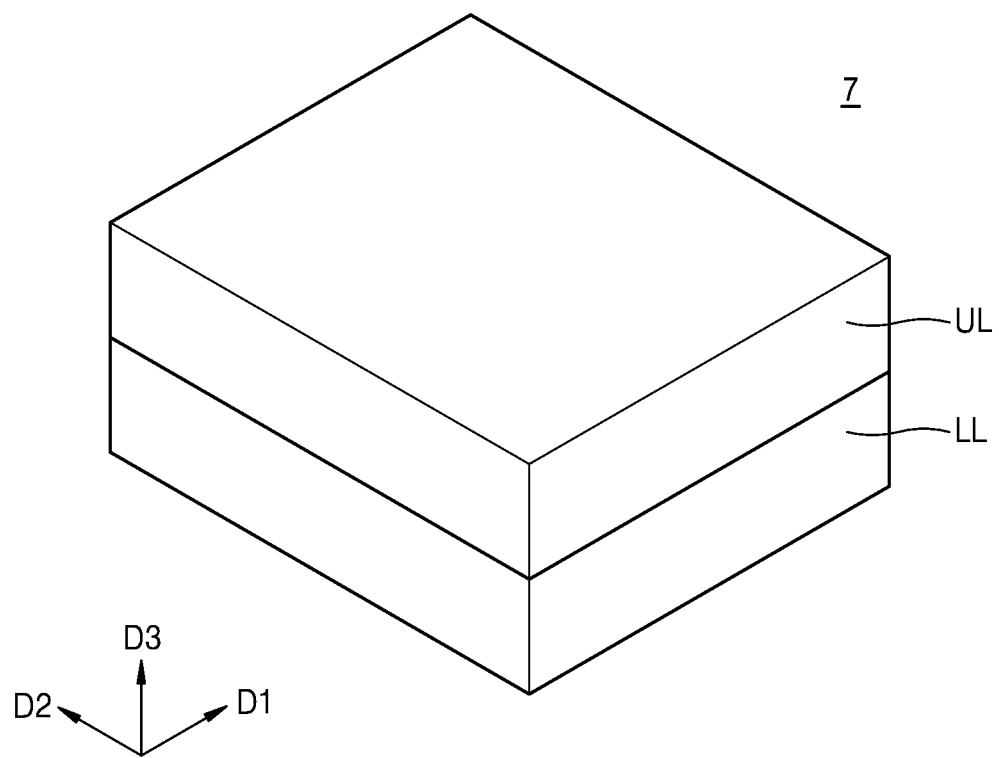
FIG. 11 is a perspective view of a wireless power receiving device according to exemplary embodiments.
Figure 12:
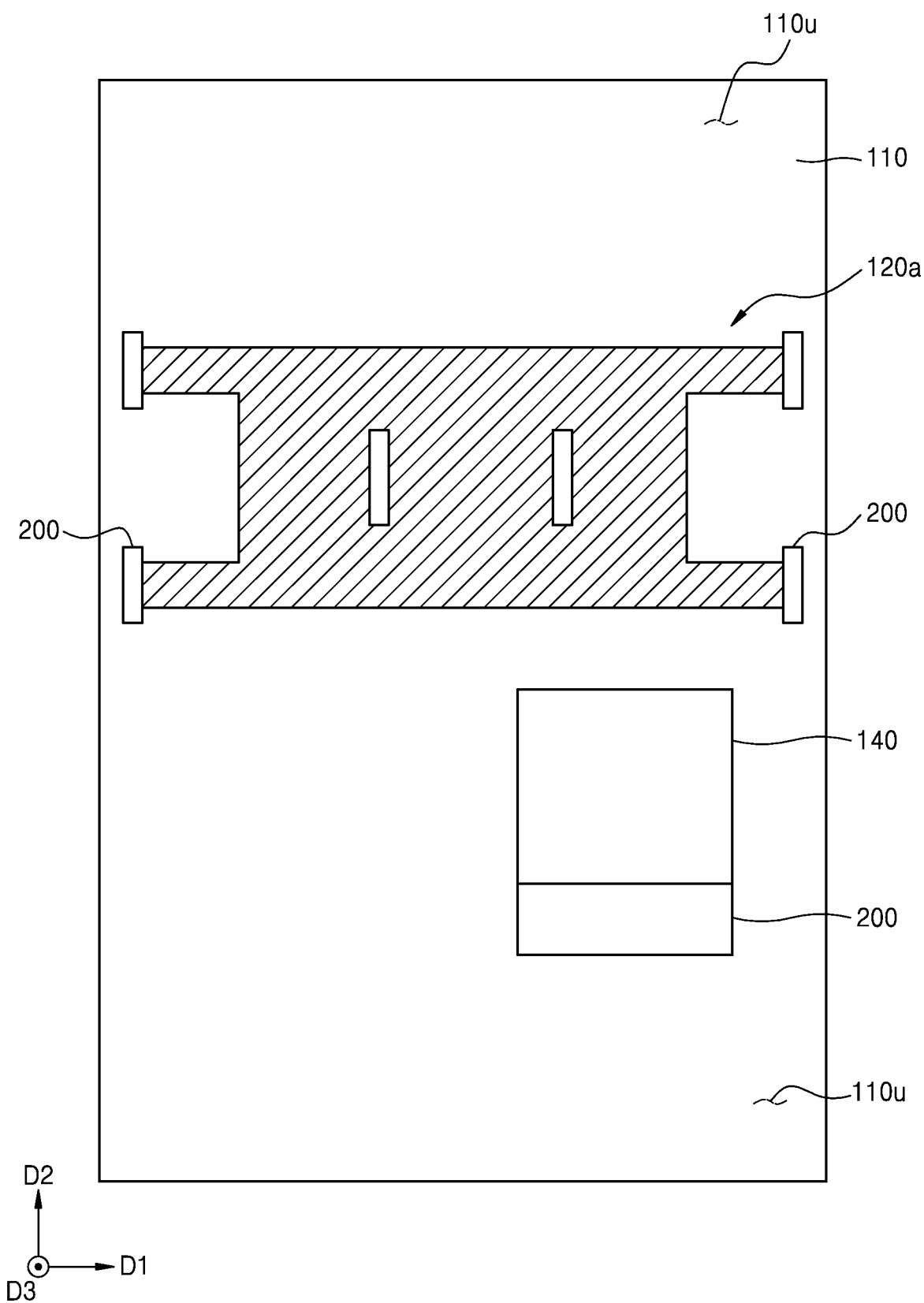
FIG. 12 is a plan view of a lower layer of the wireless power receiving device of FIG. 11.
Figure 13:
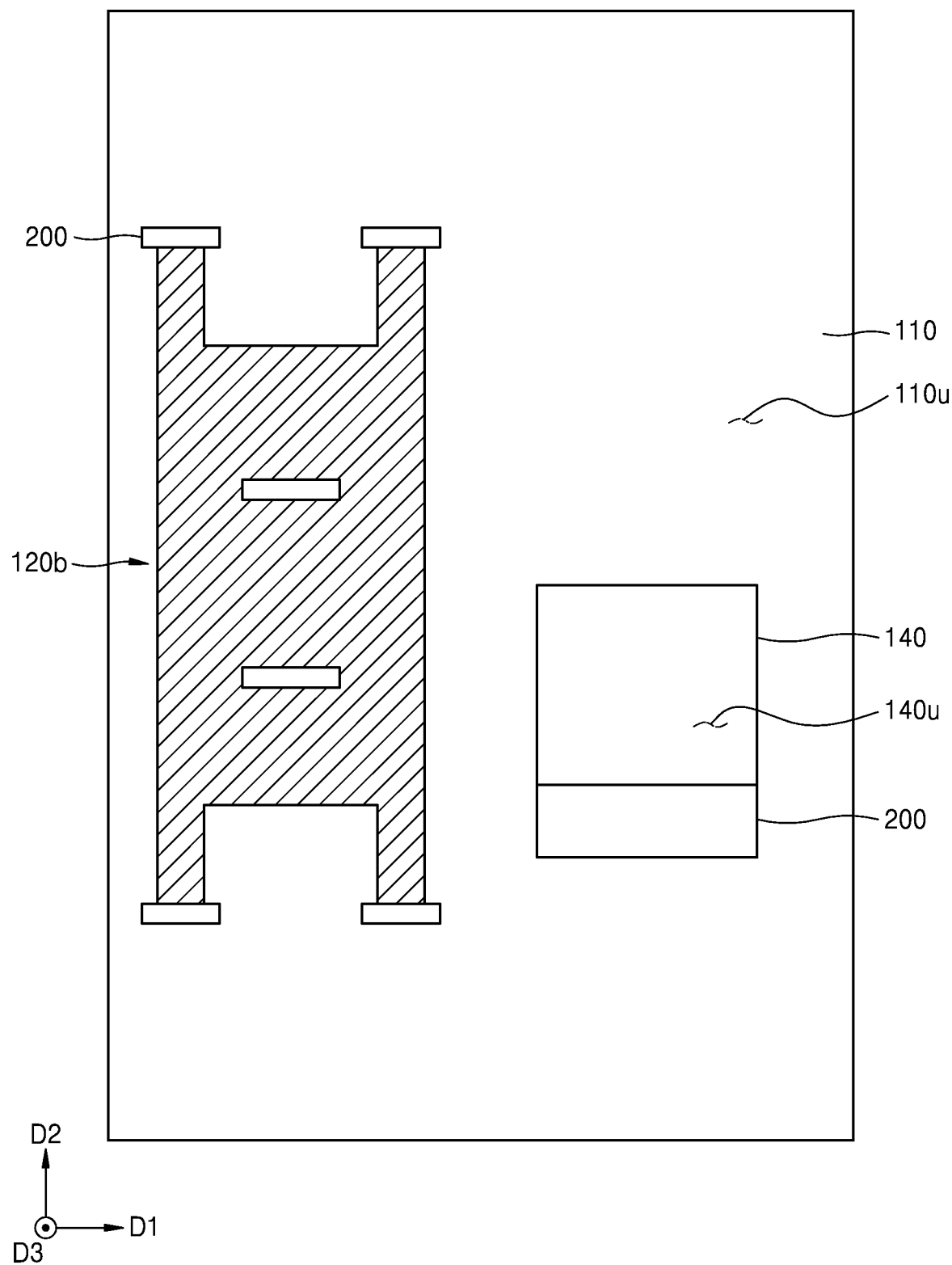
FIG. 13 is a plan view of an upper layer of the wireless power receiving device of FIG. 11.

FIG. 11 is a perspective view of a wireless power receiving device 7 according to exemplary embodiments. FIG. 12 is a plan view of a lower layer of the wireless power receiving device 7 of FIG. 11. FIG. 13 is a plan view of an upper layer of the wireless power receiving device 7 of FIG. 11. For brevity of description, substantially the same descriptions as already presented with respect to FIGS. 2, 3, and 10 may be omitted.

Referring to FIGS. 11 through 13, the wireless power receiving device 7 having a multilayer structure may be provided. The wireless power receiving device 7 may include a lower layer LL and an upper layer UL. The lower layer LL and the upper layer UL may be stacked along a third direction D3 perpendicular to an upper surface 110u of a substrate 110.

The lower layer LL may include a substrate 110, a first antenna structure 120a, a broadcast antenna structure 140, and rectifiers 200. The first antenna structure 120a may extend along the first direction D1 parallel to an upper surface 110u of the substrate 110.

The upper layer UL may include a substrate 110, a second antenna structure 120b, a broadcast antenna structure 140, and rectifiers 200. The second antenna structure 120b may extend along the second direction D2 that is parallel to an upper surface 110u of the substrate 110 and intersects the first direction D1. For example, an angle between directions in which the first and second antenna structures 120a and 120b extend may be about 80° to about 100°. For example, the direction in which the first antenna structure 120a extends may be orthogonal to the direction in which the second antenna structure 120b extends.

The present disclosure may provide the wireless power receiving device 7 with power reception efficiency improved by the first and second antenna structures 120a and 120b and the broadcast antenna structures 140. The present disclosure may provide the wireless power receiving device 7 capable of receiving radio waves that are incident in the broadside direction and the end-fire direction and have horizontal and vertical polarization components.

Figure 14:
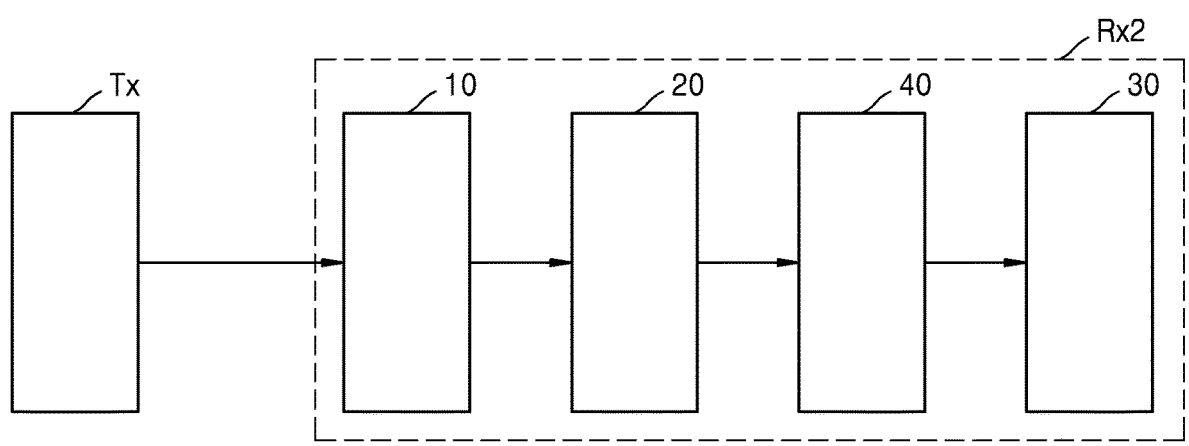
FIG. 14 is a conceptual block diagram of a wireless charging system according to exemplary embodiments.

FIG. 14 is a conceptual block diagram of a wireless charging system according to exemplary embodiments. For brevity of description, substantially the same description as already presented with respect to FIG. 1 may be omitted.

Referring to FIG. 14, a wireless power transmitting device Tx and a wireless power receiving device Rx2 may be provided. Unlike the wireless power receiving device Rx1 described with reference to FIG. 1, the wireless power receiving device Rx2 may further include a switching unit 40.

The switching unit 40 may control an electrical connection between a rectifying unit 20 and a load unit 30. For example, the switching unit 40 may determine one rectifier from among rectifiers (not shown) in the rectifying unit 20 and electrically connect the rectifier to the load unit 30. As another example, the switching unit 40 may adjust the time during which the rectifiers are electrically connected to the load unit 30.

Figure 15:
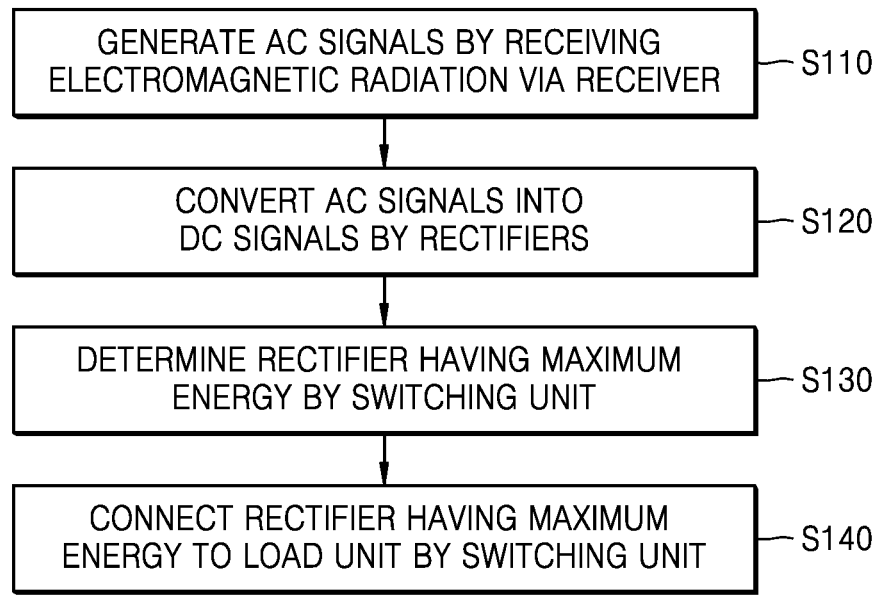
FIG. 15 is a flowchart of a method of controlling a wireless power receiving device, according to exemplary embodiments.
Figure 16:
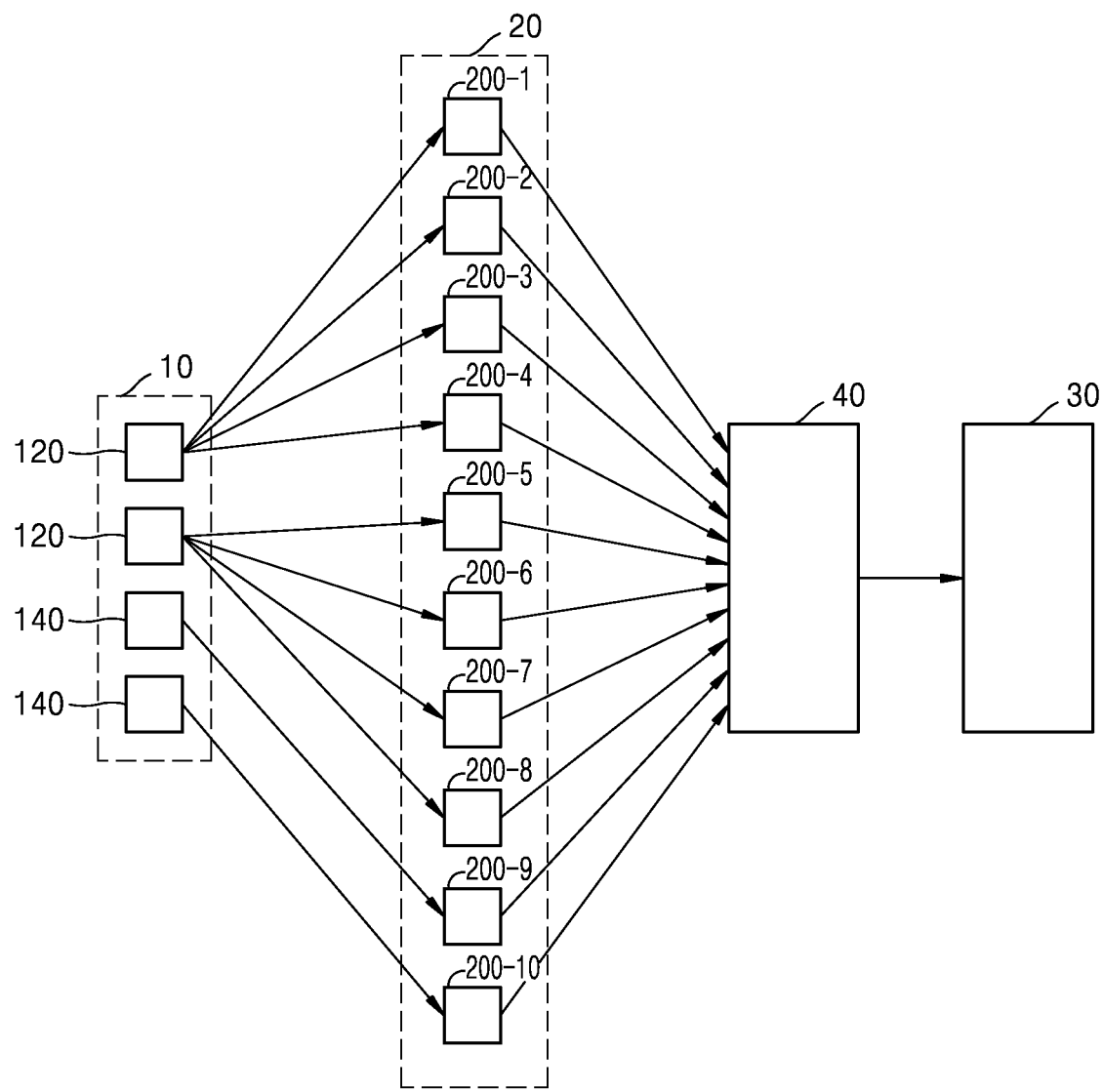
FIG. 16 is a conceptual block diagram for explaining the method of FIG. 15.

FIG. 15 is a flowchart of a method of controlling a wireless power receiving device, according to exemplary embodiments. FIG. 16 is a conceptual block diagram for explaining the method of FIG. 15. For brevity of description, substantially the same descriptions as already presented with respect to FIGS. 2, 3, and 10 may be omitted.

Referring to FIGS. 15 and 16, a receiver 10 may generate alternating current signals by wirelessly receiving power (S110). The receiver 10 may include antenna structures 120 and broadcast antenna structures 140. Each of the antenna structures 120 may be substantially the same as that described with reference to FIGS. 2 and 3. The broadcast antenna structures 140 may be substantially the same as those described with reference to FIG. 10. For example, two antenna structures 120 and two broadcast antenna structures 140 are shown. The number of antenna structures 120 and the number of broadcast antenna structures 140 are not limited to 2. The receiver 10 may provide the alternating current signals to the rectifying unit 20.

The rectifying unit 20 may convert the alternating current signals into direct current signals (S120). The rectifying unit 20 may include first through tenth rectifiers 200-1 through 200-10. The first through eighth rectifiers 200-1 through 200-8 may respectively generate direct current signals by using alternating current signals applied via the ports (124 of FIG. 2) of the antenna structures 120. The ninth and tenth rectifiers 200-9 through 200-10 may generate direct current signals by using alternating current signals respectively applied from the broadcast antenna structures 140. Each of the first through tenth rectifiers 200-1 through 200-10 may include an output capacitor (not shown). The first through tenth rectifiers 200-1 through 200-10 may respectively store energy in their corresponding output capacitors by using the direct current signals.

The switching unit 40 may select one rectifier from among the first to tenth rectifiers 200-1 to 200-10 (S130). For example, the selected rectifier may be a rectifier having a maximum energy among the first through tenth rectifiers 200-1 through 200-10. The maximum energy may refer to the largest energy stored in the output capacitors.

The switching unit 40 may connect the selected rectifier to the load unit 30 (S140). For example, the switching unit 40 may electrically connect the rectifier having the maximum energy to the load unit 30. Accordingly, energy generated by the selected rectifier may be provided to the load unit 30 by the switching unit 40.

In general, rectifiers may have their own inherent characteristics. For example, the rectifiers may have different energy accumulation levels and specific voltage values. In the present disclosure, because a rectifier having a maximum energy is connected to the load unit 30, power may be picked up regardless of the inherent characteristics of the rectifiers. Thus, power pickup characteristics may be improved.

Figure 17:
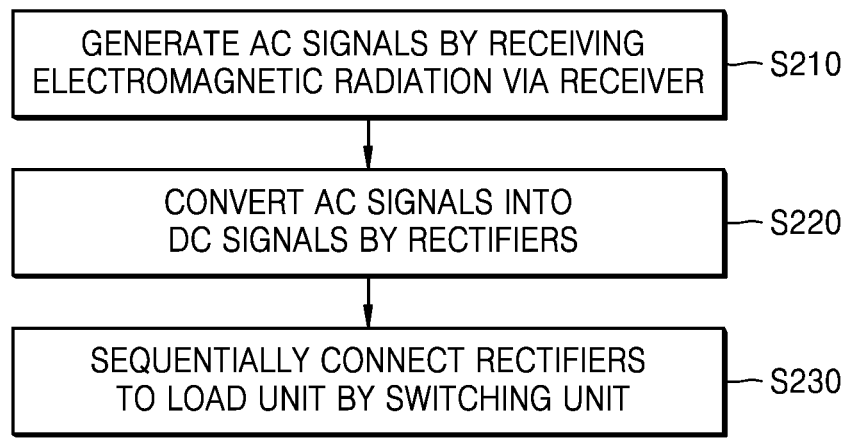
FIG. 17 is a flowchart of a method of controlling a wireless power receiving device, according to exemplary embodiments.

FIG. 17 is a flowchart of a method of controlling a wireless power receiving device, according to exemplary embodiments. For brevity of description, substantially the same description as already presented with respect to FIG. 15 may be omitted.

Referring to FIGS. 16 and 17, the receiver 10 may generate alternating current signals by wirelessly receiving power (S210). The rectifying unit 20 may convert the alternating current signals into direct current signals (S220).

Unlike in the description with reference to FIG. 15, the switching unit 40 may electrically connect the first through tenth rectifiers 200-1 through 200-10 to the load unit 30 in a sequential manner (S230). For example, the switching unit 40 may first electrically connect the first rectifier 200-1 to the load unit 30. Subsequently, the switching unit 40 may disconnect the electrical connection between the first rectifier 200-1 and the load unit 30 and electrically connect the second rectifier 200-2 to the load unit 30. By doing so, the switching unit 40 may electrically connect the first through tenth rectifiers 200-1 through 200-10 to the load unit 30 in a sequential manner.

The first through tenth rectifiers 200-1 through 200-10 may be each electrically connected to the load unit during different times. The times during which the first through tenth rectifiers 200-1 through 200-10 are connected to the load unit 30 may be determined according to the amount of energy in the first through tenth rectifiers 200-1 to 200-10. For example, the more energy a rectifier has, the longer the time the rectifier is connected to the load unit 30.

Rectifiers may generally have their own inherent characteristics. For example, the rectifiers may have different energy accumulation levels and specific voltage values. According to the present disclosure, because the more energy stored in a rectifier, the longer the time the rectifier is connected to the load unit 30, the power pickup characteristics may be improved.

The above description of the embodiments of the technical idea of the present disclosure provides an example for description of the technical idea of the present disclosure. Thus, the technical idea of the present disclosure is not limited to the above-described embodiments, and it is obvious for those of ordinary skill in the art to make modifications and changes by combining and implementing the embodiments within the technical idea of the present disclosure.

The invention claimed is:

1. A wireless power receiving device comprising:
a body;
rectifiers arranged adjacent to the body;
ports, each being located between the body and a corresponding one of the rectifiers; and
slots penetrating the body,
wherein each of the ports electrically connects the body to a corresponding one of the rectifiers,
the body and the ports receive a horizontal polarization component of electromagnetic radiation incident on the body, and
the slots receive a vertical polarization component of the electromagnetic radiation.

2. The wireless power receiving device of claim 1, wherein the ports comprise a pair of ports protruding outward from one side of the body.

3. The wireless power receiving device of claim 2, wherein the ports further comprise another pair of ports protruding outward from another side of the body, and
the one side and the other side face in opposite directions.

4. The wireless power receiving device of claim 1, wherein the ports comprise a pair of ports protruding outward from either side of the body.

5. The wireless power receiving device of claim 1, further comprising a frame separated from the ports with the rectifiers interposed therebetween,
wherein the frame comprises a conductive material, and
wherein the rectifiers are electrically connected to the frame.

6. The wireless power receiving device of claim 1,
wherein the ports protrude from the body in a first direction parallel to an upper surface of the body, and
wherein the slots extend in a second direction that is parallel to the upper surface of the body and crosses the first direction.

7. A wireless power receiving device comprising:
a first antenna structure extending in a first direction; and
a second antenna structure extending in a second direction crossing the first direction,
wherein each of the first antenna structure and second antenna structure comprises:
a body,
rectifiers arranged adjacent to the body,
ports, each being located between the body and a corresponding one of the rectifiers, and
slots penetrating the body.

8. The wireless power receiving device of claim 7, wherein an angle between the first and second directions is 80° to 100°.

9. The wireless power receiving device of claim 7, wherein the ports of the first antenna structure protrude from the body of the first antenna structure in the first direction,
wherein the slots of the first antenna structure extend in the second direction,
wherein the ports of the second antenna structure protrude from the body of the second antenna structure in the second direction, and
wherein the slots of the second antenna structure extend in the first direction.

10. The wireless power receiving device of claim 7, further comprising:
- a broadcast antenna structure configured to receive electromagnetic radiation travelling in a third direction perpendicular to the first and second directions; and
- a rectifier electrically connected to the broadcast antenna structure.

* * * * *